United States Patent
Khafagy et al.

(10) Patent No.: US 10,683,836 B2
(45) Date of Patent: Jun. 16, 2020

(54) METHODS AND SYSTEMS FOR CONTROLLING AUTOMATIC ENGINE STARTING

(71) Applicant: Ford Global Technologies, LLC, Dearborn, MI (US)

(72) Inventors: Hafiz Shafeek Khafagy, Dearborn, MI (US); Ahmed Awadi, Farmington Hills, MI (US); Hussam Makkiya, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 16/049,353

(22) Filed: Jul. 30, 2018

(65) Prior Publication Data

US 2020/0032758 A1 Jan. 30, 2020

(51) Int. Cl.
*F02N 11/08* (2006.01)
*B60K 23/08* (2006.01)
*B60K 17/34* (2006.01)

(52) U.S. Cl.
CPC .......... *F02N 11/0833* (2013.01); *B60K 23/08* (2013.01); *B60K 17/34* (2013.01); *F02N 2200/08* (2013.01); *F02N 2200/102* (2013.01)

(58) Field of Classification Search
CPC ..... B60K 23/08; B60K 23/0808; Y02T 10/48; F02N 11/0814; F02N 11/0844; F02N 11/0818; F02N 11/0822; F02N 11/0825; F02N 11/084; F02N 11/0837
USPC ...................................... 123/179.4
See application file for complete search history.

(56) References Cited

U.S. PATENT DOCUMENTS

| | | | | |
|---|---|---|---|---|
| 4,392,059 A * | 7/1983 | Nespor | ................. | F02N 11/101 123/179.2 |
| 4,414,937 A * | 11/1983 | Ueda | ..................... | B60K 28/00 123/179.1 |
| 7,027,912 B1 * | 4/2006 | Metzger | ............ | B60H 1/00778 123/179.4 |
| 8,556,773 B2 | 10/2013 | Oba | | |
| 2004/0262995 A1 * | 12/2004 | Hawkins | ............ | F02N 11/0803 307/10.6 |
| 2005/0143901 A1 * | 6/2005 | Scholt | ................ | F02N 11/0818 701/112 |
| 2006/0217228 A1 * | 9/2006 | Devita | .................. | B60K 6/445 477/3 |
| 2007/0200431 A1 * | 8/2007 | Yamaguchi | ............ | F02D 17/04 307/10.7 |
| 2011/0270501 A1 * | 11/2011 | Ito | ...................... | F02N 11/0833 701/70 |
| 2012/0270701 A1 * | 10/2012 | Christen | ............ | F02N 11/0818 477/171 |
| 2014/0106932 A1 * | 4/2014 | Kato | ............... | B60W 30/18018 477/83 |
| 2015/0266467 A1 * | 9/2015 | Mansur | ................ | B60W 10/06 701/22 |

(Continued)

*Primary Examiner* — Sizo B Vilakazi
(74) *Attorney, Agent, or Firm* — Geoffrey Brumbaugh; McCoy Russell LLP

(57) ABSTRACT

Systems and methods for improving operation of a four wheel drive vehicle that includes automatic engine stopping and starting are presented. In one example, engagement of a driveline wheel mode is not permitted when an engine is automatically started so that a driveline wheel mode actuator may fully engage a driveline wheel mode when it is requested to do so.

20 Claims, 4 Drawing Sheets

(56) References Cited

U.S. PATENT DOCUMENTS

2016/0304096 A1* 10/2016 Khafagy ......... B60W 30/18109
2017/0356415 A1* 12/2017 Khafagy .................. B60K 6/48

* cited by examiner

METHODS AND SYSTEMS FOR CONTROLLING AUTOMATIC ENGINE STARTING

FIELD

The present description relates to a system and methods for controlling automatic starting of an internal combustion engine. The methods and system may be particularly useful for engines that are frequently stopped and restarted to conserve fuel.

BACKGROUND AND SUMMARY

An engine of a vehicle may be automatically stopped without a human driver providing input to a device that has a sole purpose or function of stopping engine rotation to conserve fuel. The engine may be automatically restarted in response to an increase in driver demand torque, release of a brake pedal, low battery charge, or other conditions. The conditions that trigger an automatic engine restart may allow the engine to be restarted so that the battery may be recharged and so that engine torque may be provided to the vehicle's driveline, but automatic engine starting may influence other vehicle systems in ways that may be less than desirable. Therefore, it may be desirable to provide a way of automatically restarting an engine that may have less influence on other vehicle systems.

The inventors herein have recognized some dis-advantages of automatic engine restarting and have developed a method for operating an engine, comprising: automatically stopping an engine via a controller; and via the controller, inhibiting automatic starting of the engine while changing from a first driveline wheel mode to a second driveline wheel mode.

By inhibiting automatic starting of an engine while changing from a first driveline wheel mode to a second driveline wheel mode, it may be possible to provide the technical result of improved automatic engine starting. For example, if a vehicle operator is attempting to change from a two wheel drive mode to a four wheel drive mode, automatic engine starting may be inhibited until the driveline wheel mode change is complete. This allows the driveline wheel mode to be completely engaged before the engine is automatically restarted so that battery voltage is high enough to complete the driveline wheel mode engagement. After the driveline wheel mode is completely engaged, the engine may be automatically started. On the other hand, if the engine is in the process of automatically starting and a driveline wheel mode is requested, engagement of the driveline wheel mode may be delayed until the engine starting is complete so that the driveline wheel mode may be completely engaged.

The present description may provide several advantages. In particular, the approach may improve driveline wheel mode engagement. In addition, the approach may reduce the possibility of driveline wheel mode actuator degradation. Further, under some conditions, the approach may improve vehicle launches by fully engaging a driveline wheel mode before vehicle launch.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
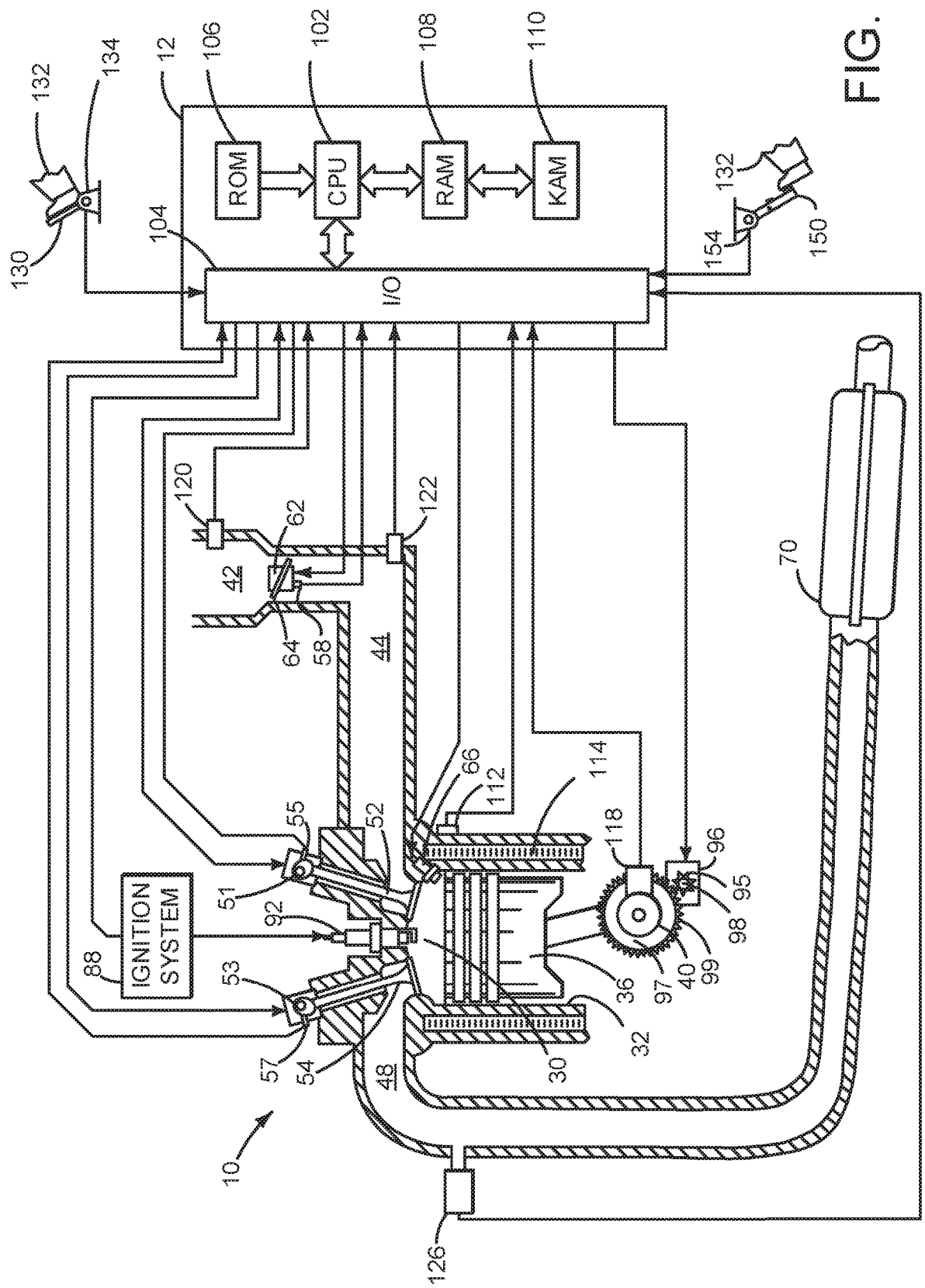
FIG. 1 is a schematic diagram of an engine.
Figure 2:
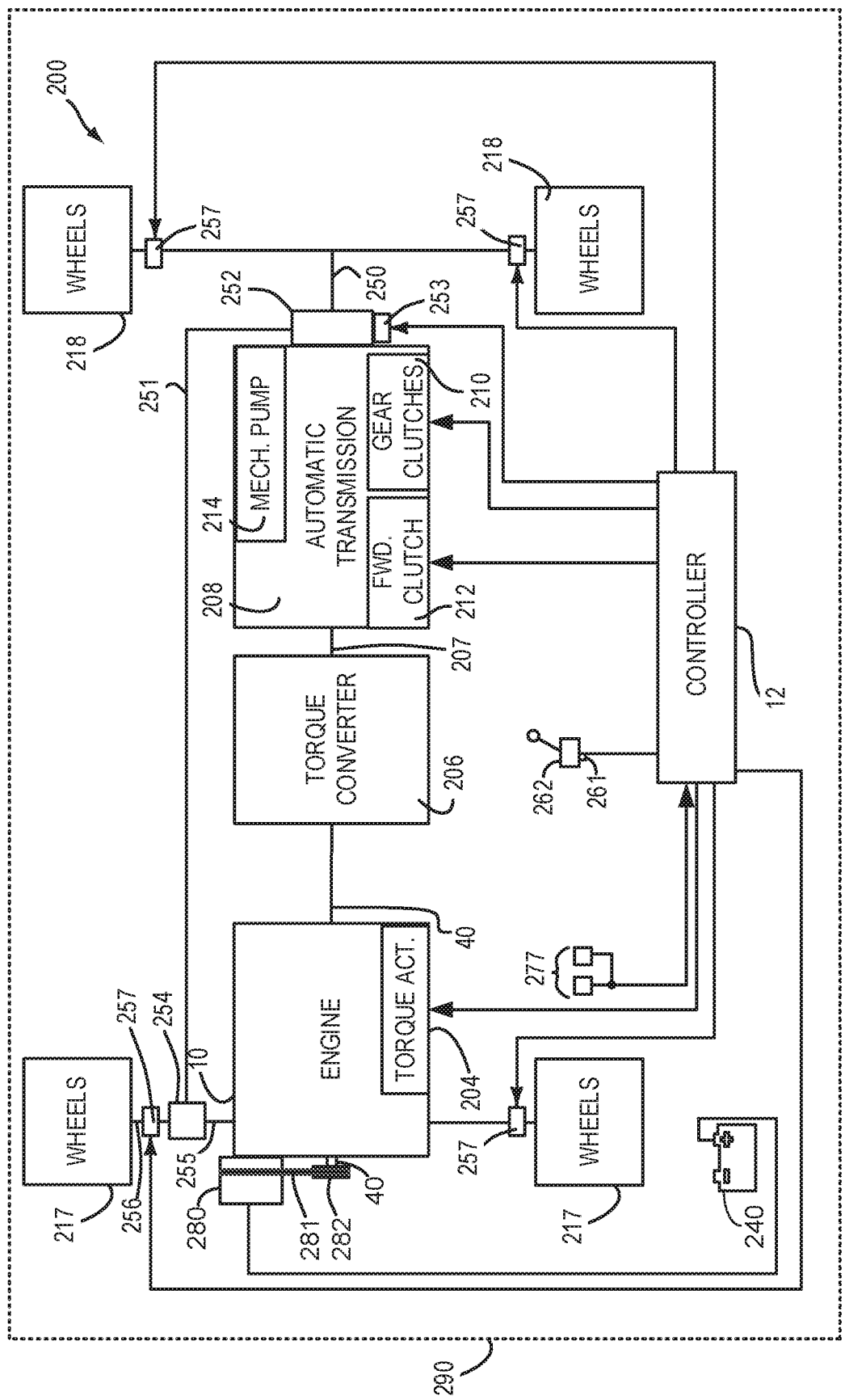
FIG. 2 shows an example vehicle driveline.
Figure 3:
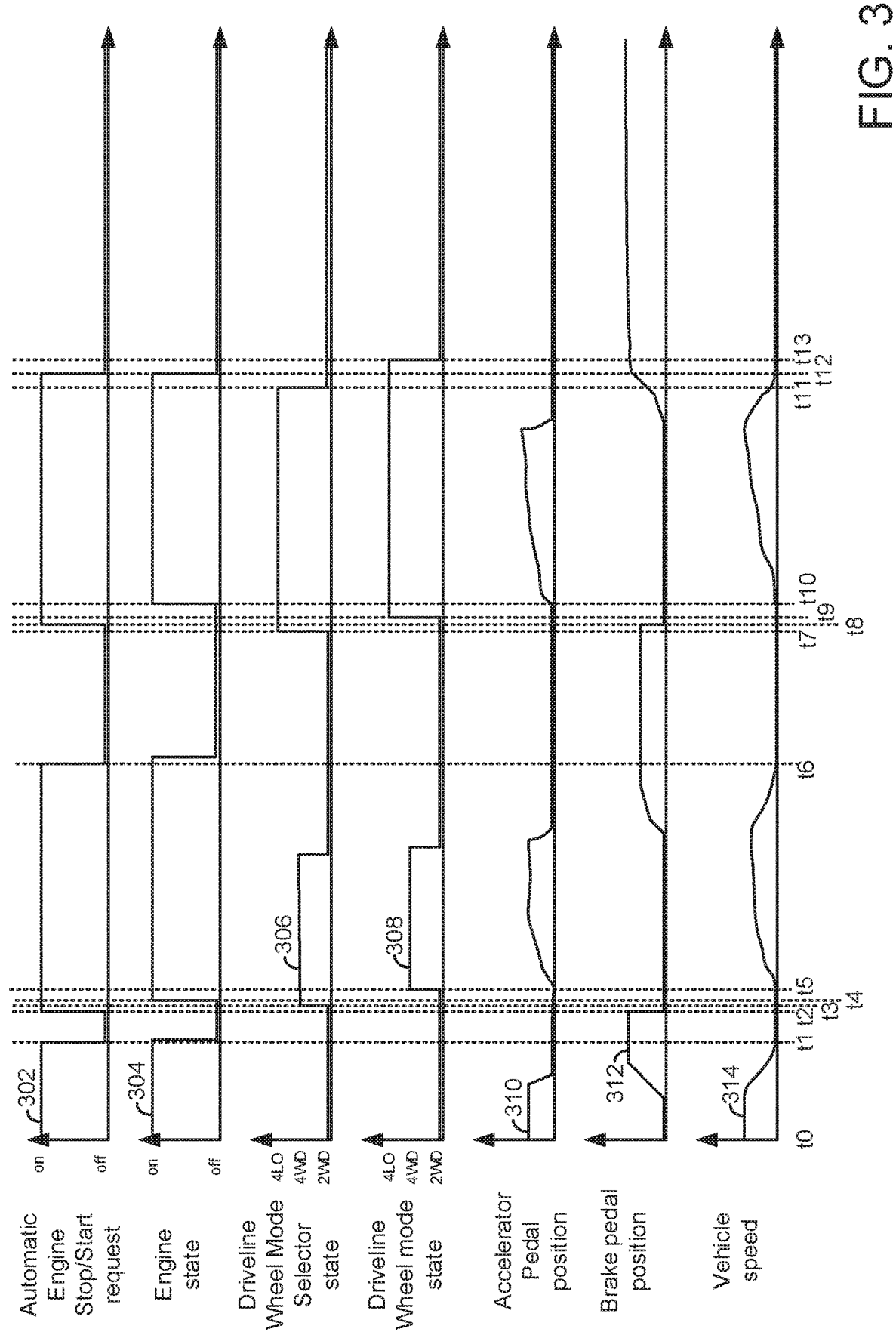
FIG. 3 shows an example prophetic engine operating sequence according to the method of FIG. 4.

The present description is related to controlling engine and driveline operation of a vehicle. The vehicle may include an engine for propelling the vehicle. FIG. 1 shows an example engine system. The engine may be included in a driveline as shown in FIG. 2. The engine and driveline may operate as shown in the sequence of FIG. 3. The engine and driveline may be operated according to the method of FIG. 4.

Referring to FIG. 1, internal combustion engine 10 comprises a plurality of cylinders, one cylinder of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown)

including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a block diagram of a vehicle 290 including a powertrain or driveline 200. The powertrain of FIG. 2 includes engine 10 shown in FIG. 1. Powertrain 200 is shown including controller 12.

Engine 10 may be started with an engine starting system shown in FIG. 1 or via belt driven integrated starter/generator (BISG) 280. Further, torque of engine 10 may be adjusted via torque actuator 204, such as a fuel injector, throttle, etc.

BISG 280 is mechanically coupled to engine 10 via belt 281 and pulley 282. BISG 280 may be coupled to crankshaft 40 or a camshaft (e.g., 51 or 53). BISG 280 may operate as a motor when supplied with electrical power via electric energy storage device 275. BISG 280 may operate as a generator supplying electrical power to electric energy storage device 240 (e.g., a battery or capacitor).

An engine output torque may be transmitted to torque converter 206. Torque converter 206 is mechanically coupled to automatic transmission 208 via transmission input shaft 207. Torque converter 206 may also include a torque converter bypass lock-up clutch (not shown). Automatic transmission 208 includes gear clutches (e.g., gears 1-10) 210 and forward clutch 212. Automatic transmission 208 is a fixed step ratio transmission. The gear clutches 210 and the forward clutch 212 may be selectively engaged to change a ratio of an actual total number of turns of input shaft 207 to an actual total number of turns of rear wheels 218. Gear clutches 210 may be engaged or disengaged via adjusting fluid supplied to the clutches via shift control solenoid valves (not shown). Torque output from the automatic transmission 208 may also be relayed to transfer case 252 where engine torque may be transferred to rear wheels 218 and front wheels 217 to propel the vehicle via output shaft 250 and output shaft 251. Specifically, automatic transmission 208 may transfer an input driving torque at the input shaft 207 responsive to a vehicle traveling condition before transmitting an output driving torque to the rear wheels 216 and front wheels 217. Controller 12 may selectively activate a torque converter clutch (not shown), gear clutches 210, and forward clutch 212. Controller 12 may also selectively deactivate or disengages a torque converter clutch (not shown), gear clutches 210, and forward clutch 212.

Front wheels 217 may be selectively coupled and decoupled from transmission 208 and rear wheels via electrical driveline wheel mode actuators 253 and 257. Electrical driveline wheel mode actuator 253 may be an electrically actuated clutch or an electrically operated solenoid that selectively applies a vacuum to engage or disengage front wheels 217 to automatic transmission 208 via transfer case 252. Electrical driveline wheel mode actuators 257 may be electrically driven clutches that allow each wheel to be individually coupled to or decoupled from automatic transmission 208. Controller 12 may change driveline wheel modes via actuators 253 and 257 responsive to a position of a selector switch 262. Driveline mode selector position sensor 261 provides feedback of a position of selector switch 262 to controller 12.

In response to a request to accelerate vehicle 290, controller 12 may obtain a driver demand torque or power request from an accelerator pedal or other device. Controller 12 then allocates a fraction of the requested driver demand torque to the engine and the remaining fraction to the BISG 280. Controller commands engine 10 and BISG 280 to generate commanded torques. If the engine torque is less than a transmission input torque limit (e.g., a threshold value not to be exceeded), the torque is delivered to torque converter 206, which then relays at least a fraction of the requested torque to transmission input shaft 207. The transmission torque converter clutch (not shown) may be locked and gears may be engaged via gear clutches 210 in response to shift schedules and torque converter clutch lockup schedules that may be based on transmission input shaft torque and vehicle speed. In some conditions when it may be desired to charge electric energy storage device 240, a charging torque (e.g., a negative BISG torque) may be requested while a non-zero driver demand torque is present. Controller 12 may request increased engine torque to overcome the charging torque to meet the driver demand torque.

In response to a request to decelerate vehicle 290 and provide regenerative braking, controller 12 may provide a negative desired wheel torque based on vehicle speed and brake pedal position. Controller 12 then allocates a fraction of the negative desired wheel torque to the BISG 280 (e.g., desired powertrain wheel torque) and/or engine 10, and the remaining fraction to friction brakes (not shown). Further, controller 12 may shift gears 211 based on a unique shifting schedule to increase regeneration efficiency. Engine 10 may provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or BISG 280 because of transmission or BISG limits may be allocated to friction brakes (not shown) so that the desired wheel torque is provided by a combination of negative wheel torque from friction brakes (not shown), engine 10, and BISG 280.

Engine torque may be controlled by controller 12 adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may control also torque output and electrical energy production from BISG 280 by adjusting current flowing to and from field and/or armature windings of BISG as is known in the art.

Controller 12 may receive transmission input shaft position via a position sensor (not shown) and convert transmission input shaft position into input shaft speed via differentiating a signal from the position sensor. Controller 12 may receive transmission output shaft torque from a torque sensor (not shown). Controller 12 may also receive addition transmission information from sensors 277, which may include but are not limited to pump output line pressure sensors, transmission hydraulic pressure sensors (e.g., gear clutch fluid pressure sensors), BISG temperature sensors, and ambient temperature sensors.

The system of FIGS. 1 and 2 provides for a vehicle system, comprising: an engine; at least one driveline wheel mode actuator; and a controller coupled to the engine, the engine controller including executable instructions stored in non-transitory memory to automatically stop the engine via the controller, and inhibit automatic starting of the engine while changing from a first driveline wheel mode to a second driveline wheel mode via the at least one driveline wheel mode actuator. The vehicle system further comprises additional instructions to inhibit changing from the first driveline wheel mode to the second driveline wheel mode while the engine is being automatically started via a starter. The vehicle system further comprises a driveline wheel mode actuator and additional instructions to prevent electrical current flow to the driveline wheel mode actuator while inhibit changing from the first driveline wheel mode to the second driveline wheel mode. The vehicle system further comprises a driveline wheel mode selector and additional instructions to determine a state of the driveline wheel mode selector. The vehicle system includes where inhibiting automatic starting of the engine includes preventing a starter from rotating. The vehicle system includes where inhibiting automatic starting of the engine includes preventing fuel injection to the engine.

Figure 4:
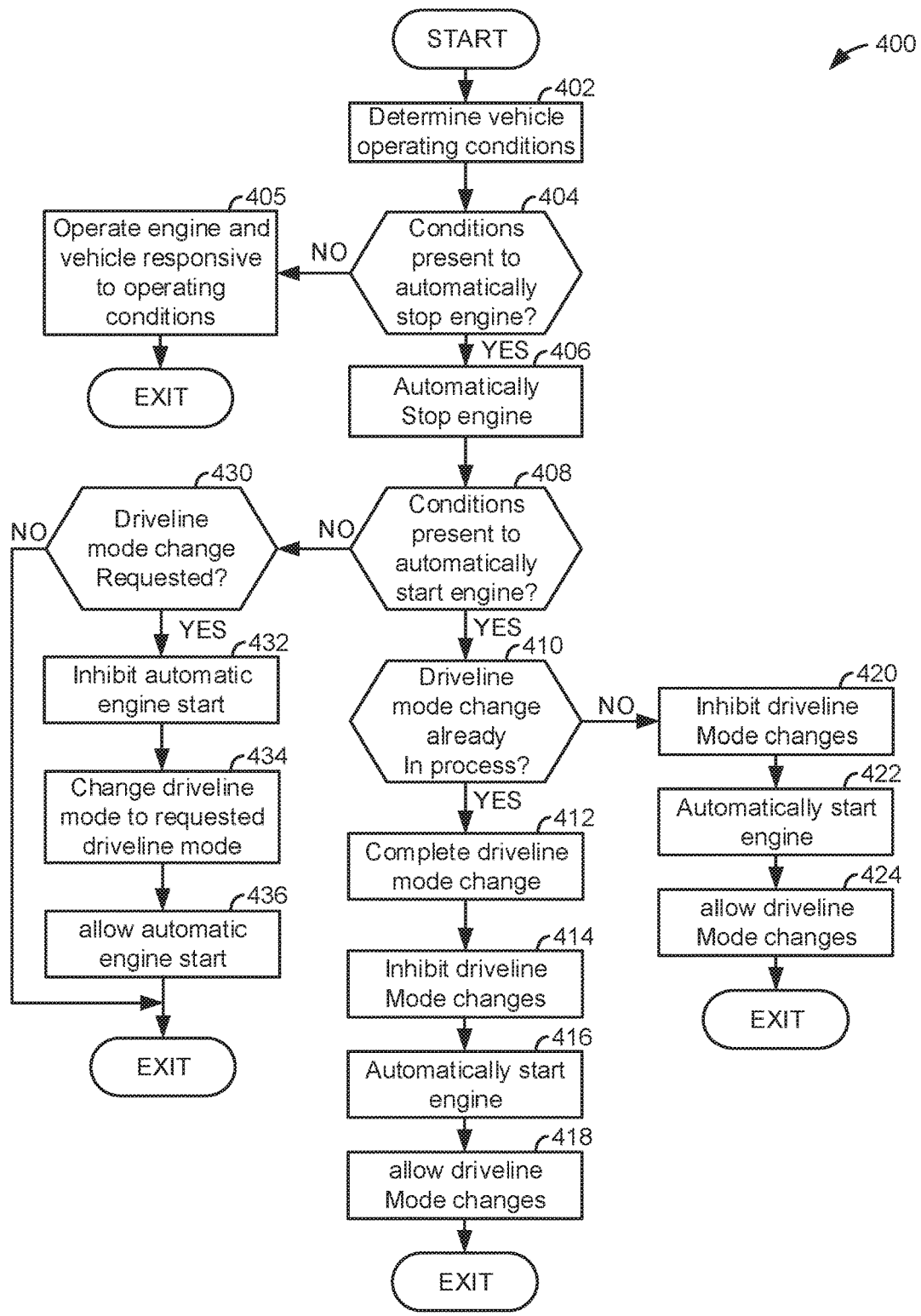
FIG. 4 shows an example flowchart of a method for operating an engine.

Referring now to FIG. 3, an engine operating sequence according to the method of FIG. 4 is shown. The sequence of FIG. 3 may be performed via the system of FIGS. 1 and 2 in cooperation of the method of FIG. 4. The plots shown in FIG. 3 are time aligned and occur at a same time. The vertical lines at t0-t13 represent times of interest during the sequence.

The first plot from the top of FIG. 3 is a plot of an automatic engine stop/start request state versus time. The vertical axis represents an automatic engine stop/start request state. An automatic engine stop is requested when trace 302 is at a lower level near the horizontal axis. The automatic engine start is requested when trace 302 is at a higher level near the vertical axis arrow. The horizontal axis represents time and the amount of time increases from the left side of the plot to the right side of the plot. Trace 302 represents the automatic engine stop/start request state. An automatic engine stop is an engine stop (e.g., cease engine rotation and fueling of the engine) that may be initiated via a controller in response to vehicle operating conditions without a driver providing input to a device that has a sole purpose of activating and deactivating the vehicles driveline including the engine, such as a key switch or a pushbutton. An automatic engine stop may be initiated when driver demand torque is less than a threshold, for example.

The second plot from the top of FIG. 3 is a plot of an engine operating state versus time. The vertical axis represents an engine operating state. The engine operating state is not asserted and the engine is not operating (e.g., not rotating and combusting fuel) when trace 304 is at a lower level near the horizontal axis. The engine operating state is asserted and the engine is operating (e.g., rotating and combusting fuel) when trace 304 is at a higher level near the vertical axis arrow. Trace 304 represents engine operating state. The horizontal axis represents time and the amount of time increases from the left side of the plot to the right side of the plot.

The third plot from the top of FIG. 3 is a plot of a driveline wheel mode selector state (e.g., state of selector switch 262 shown in FIG. 2) versus time. The vertical axis represents driveline wheel mode selector state and 2 WD indicates two wheel drive is selected, 4 WD indicates that four wheel drive high gear range is selected, and 4 LO indicates that four wheel drive low gear range is selected. Trace 306 represents driveline wheel mode selector state. The horizontal axis represents time and the amount of time increases from the left side of the plot to the right side of the plot.

The fourth plot from the top of FIG. 3 is a plot of driveline wheel mode state versus time. The vertical axis represents actual or engaged driveline wheel mode state and the driveline is engaged in a particular driveline wheel mode when trace 308 is at a level of a wheel mode that is indicated along the vertical axis. Trace 308 represents the driveline wheel mode state. The horizontal axis represents time and the amount of time increases from the left side of the plot to the right side of the plot.

The fifth plot from the top of FIG. 3 is a plot of accelerator pedal position versus time. The vertical axis represents accelerator pedal position and accelerator pedal position increases in the direction of the vertical axis arrow. The horizontal axis represents time and the amount of time increases from the left side of the plot to the right side of the plot.

The sixth plot from the top of FIG. 3 is a plot of brake pedal position versus time. The vertical axis represents brake pedal position and brake pedal position increases in the direction of the vertical axis arrow. The horizontal axis represents time and the amount of time increases from the left side of the plot to the right side of the plot.

The seventh plot from the top of FIG. 3 is a plot of vehicle speed versus time. The vertical axis represents vehicle speed and vehicle speed increases in the direction of the vertical axis arrow. Trace 314 represents vehicle speed. The horizontal axis represents time and the amount of time increases from the left side of the plot to the right side of the plot.

At time t0, the engine is running and vehicle speed is at a middle level. The driveline is in two wheel drive mode and the accelerator pedal is applied to a middle level. The brake is not applied. Such conditions may be present when the vehicle is traveling on a road at a constant speed.

Between time t0 and time t1, the human driver (not shown) releases the accelerator pedal and applies the brake pedal. The engine remains running and the driveline wheel mode remains in two wheel drive. The vehicle speed decreases as the brakes are applied.

At time t1, the vehicle stops and the engine is stopped shortly after time t1 as indicated by the automatic engine stop transitioning to a lower level and the engine state transitioning to off. The driveline mode remains in two wheel drive and the accelerator pedal is fully released. The brake pedal is applied and vehicle speed is zero.

At time t2, the brake pedal is fully released and an automatic engine start request is issued in response to the brake pedal being released. The engine is not running and the driveline wheel mode selector remains in the two wheel drive position. The driveline mode remains in two wheel drive and the accelerator pedal is not applied. The vehicle speed is zero.

At time t3, the driver moves the driveline wheel mode selector and requests entry into four wheel drive high gear range. The driveline does not engage into the four wheel drive high gear range, nor is the state of the electrical driveline wheel mode actuator (not shown) changed to enter four wheel drive high gear range. Rather, the electrical driveline wheel mode actuator is not allowed to change state so that engine starting may complete before engagement into four wheel drive high gear range is permitted. The engine is not started and the accelerator pedal remains fully released. The brake pedal remains released and vehicle speed is zero.

At time t4, the engine is started and running as indicated by the engine state transitioning to a high level and the engine start request remains asserted. The electrical driveline wheel mode actuator (not shown) is activated after the engine is started and the driveline begins to engage four wheel drivel high gear range. The driveline wheel mode selector remains in the four wheel high gear range. The driveline wheel mode remains in the two wheel drive range. The accelerator pedal is not applied and the brake pedal is fully released. The vehicle speed is zero.

At time t5, the driveline wheel mode changes to four wheel high gear range as indicated by the driveline wheel mode state changing to the 4WD level. The driveline mode selector remains in the 4WD position and the engine continues to run as indicated by the engine state trace 304 being at a high level. The accelerator pedal starts to be depressed by the vehicle operator (not shown) and vehicle speed begins to increase. The brake pedal is released.

Between time t5 and time t6, the engine remains running and an automatic engine stop is not requested. The vehicle driver (not shown) changes the driveline wheel mode selector from the 4 WD position to the 2 WD position and the driveline wheel mode is change to 2 WD as indicated by trace 308 transitioning to a lower level. The accelerator pedal position increases and then decreases near time t6. The brake pedal is not initially applied and then it is applied near time t6. The vehicle speed increases and then it decreases near time t6.

At time t6, an automatic engine stop is requested in response to the accelerator pedal being fully released and vehicle speed being zero. The engine is not stopped and the driveline wheel mode selector state remains in the 2 WD position. The driveline wheel mode state remains in two wheel drive. The accelerator pedal is fully released and the brake pedal is applied. Vehicle speed is zero.

Between time t6 and time t7, the engine remains stopped and an automatic engine start is not requested. The driveline wheel mode selector remains in the 2 WD position and the driveline wheel mode remains in the two wheel drivel mode. The accelerator pedal is not applied and the brake pedal is applied. Vehicle speed is zero.

At time t7, the driver changes the driveline wheel mode selector to the 4 LO range. The electric driveline wheel mode actuator (not shown) begins to change driveline modes, but the driveline wheel mode state remains in two wheel drive mode. An automatic engine start is not requested and the engine is stopped (not running or rotating). The accelerator pedal is not applied and the brake pedal is applied. Vehicle speed remains at zero.

At time t8, an automatic engine start is requested, but the engine is not rotated or started because the driveline wheel mode change is already in process. The electric driveline wheel mode actuator (not shown) continues to facilitate the driveline wheel mode change, but the driveline is not yet fully engaged in four wheel low gear range. The engine is stopped and it is not rotating. The accelerator pedal is not applied and the brake pedal is fully released, which caused the automatic engine start request to be asserted. The vehicle speed remains zero.

At time t9, the driveline wheel mode state changes to 4 LO to indicate that four wheel drive low gear range mode is engaged. The driveline wheel mode selector state remains in the 4 LO position. The engine remains stopped and the automatic engine start request remains asserted. The accelerator pedal is not applied and the brake pedal is released. Vehicle speed remains at zero.

At time t10, the engine state changes to a high level to indicate that the engine is started and combusting fuel. The automatic engine start request remains asserted and the driveline wheel mode selector remains in the 4 LO position. The accelerator pedal begins to be applied by the human driver (not shown) and the brake pedal is not applied. The vehicle speed begins to increase.

Between time t10 and time t11, the engine remains running and an automatic engine stop is not requested. The driveline wheel mode selector remains in the 4 LO position and the driveline wheel mode remains in four wheel drive in low gear range. The accelerator pedal position increases and then decreases near time t11. The brake pedal is not initially applied and then it is applied near time t11. The vehicle speed increases and then it decreases near time t11.

At time t11, the human driver (not shown) changes the position of the driveline wheel mode selector to 2 WD while the driveline wheel mode is in four wheel drive low gear range. The electric driveline wheel mode actuator (not shown) begins to change the driveline mode from 4 LO to 2WD. The accelerator pedal is not applied and the engine continues to run (e.g., combust fuel). The automatic engine stop request is not asserted and the brake pedal is applied. The vehicle speed continues to decrease.

At time t12, vehicle speed reaches zero and an automatic engine stop is requested. The engine is stopped shortly after the automatic engine stop is requested. The electric driveline wheel mode actuator (not shown) continues to change driveline modes, but two wheel drive mode is not fully engaged. The accelerator pedal is not applied and the brake pedal is applied.

At time t13, the electric driveline wheel mode actuator (not shown) finishes changing the driveline wheel mode to two wheel drive and the driveline is engaged in two wheel drive mode. The engine remains stopped and the automatic engine start request is not asserted. The accelerator pedal is not applied and the brake pedal is applied.

In this way, a change in the driveline wheel mode may be delayed until an engine is started if the engine starting process has begun. By delaying the driveline wheel mode change, it may be possible for an electric driveline wheel mode actuator to change driveline wheel modes in a way that fully engages the desired or new driveline wheel mode. Further, an automatic engine start may be delayed while a driveline wheel mode change is in progress so that the desired or new driveline wheel mode may fully engage. The engine may be automatically started as soon as the desired or new driveline wheel mode is fully engaged.

Referring now to FIG. 4, a method for operating an engine and driveline is shown. The method of FIG. 4 may be stored as executable instructions in controller 12 as part of the system of FIGS. 1 and 2. Further, the method of FIG. 4 may generate the example sequence shown in FIG. 3. In addition, the methods of FIG. 4 may work in cooperation with the system of FIGS. 1 and 2 to receive data and adjust actuators to control the system of FIGS. 1 and 2 in the physical or real world.

At 402, method 400 determines vehicle operating conditions. Vehicle operating conditions may be determined via the controller receiving input from the various sensors that are coupled to the controller. Vehicle operating conditions may include but are not limited to driver demand torque, vehicle speed, engine speed, engine load, transmission operating state, ambient temperature, ambient pressure, engine temperature, vehicle speed, battery state of charge (SOC), and steering wheel angle. Method 400 proceeds to 404.

At 404, method 400 judges if conditions are present to automatically stop the vehicle's engine. In one example, the vehicle's engine may be automatically stopped without a driver providing input to a device that has a sole purpose or function of starting and stopping the vehicle's engine. In other words, method 400 judges if the vehicle's engine should be automatically stopped without the vehicle's driver specifically requesting that the engine stop via an ignition switch or pushbutton. In one example, method 400 may judge that the engine is to be automatically stopped in response to driver demand torque being less than a threshold torque while engine temperature is greater than a threshold temperature. Further, method 400 may also require that additional conditions be met to automatically stop the engine. For example, method 400 may require that battery state of charge is greater than a threshold amount of charge and that vehicle speed is less than a threshold speed. If method 400 judges or determines that conditions are present to automatically stop the engine, the answer is yes and method 400 proceeds to 406. Otherwise, the answer is no and method 400 proceeds to 405 after determining that conditions are not present to automatically stop the engine.

At 405, method 400 operates the engine and vehicle responsive to operating conditions. For example, the engine torque output may be adjusted responsive to driver demand torque. The driver demand torque may be determined from accelerator pedal position and vehicle speed. In one example, accelerator pedal position and vehicle speed reference a table or function and the table or function outputs the driver demand torque. The driver demand torque may be empirically determined via operating the engine in a vehicle on a road and adjusting driver demand torque values in the table or function responsive to accelerator pedal position and vehicle speed.

In addition, method 400 may change between driveline wheel modes in response to a position of a driveline wheel mode selector when the engine is running. In some examples, method 400 may change between driveline wheel modes in response to a position of a driveline wheel mode selector when the engine is not running. Method 400 proceeds to exit.

At 406, method 400 automatically stops the engine. The engine may be automatically stopped by ceasing to supply fuel and spark to engine cylinders. Combustion in the engine stops and the engine stops rotating when the engine is stopped. Method 400 proceeds to 408 after the engine is automatically stopped.

At 408, method 400 judges if conditions to automatically restart the engine are present. In one example, method 400 may judge if the driver has applied a brake pedal or accelerator pedal to initiate the automatic engine restart. Further, a request to start the engine may be initiated in response to battery state of charge being reduced to less than a threshold amount of charge or other vehicle conditions. If method 400 judges that the driver has performed actions to automatically start the engine or other vehicle conditions facilitate a desired to automatically start the engine, the answer is yes and method 400 proceeds to 410. Otherwise, if method 400 judges that the driver has not performed the actions to automatically restart the engine or that other vehicle conditions do not facilitate a desired to automatically start the engine, the answer is no and method 400 proceeds to 430.

At 430, method 400 judges if a driveline wheel mode change is requested. A driveline wheel mode is a driveline mode whereby the direction of torque flow from the driveline to vehicle wheels is defined. For example, the driveline may be operated in a two wheel drive mode where only the front wheels or only the rear wheels receive power from driveline torque sources (e.g., internal combustion engines and/or electric machines). The driveline wheel mode is two wheel drive in this case. The driveline may also be operated in a four wheel drive mode high gear range where the front wheels and rear wheels receive power from driveline torque sources (e.g., internal combustion engines and/or electric machines) and where the gear ratio between the torque sources and the wheels is a relatively high gear ratio. The driveline wheel mode is four wheel drive high gear range in this case. The driveline may also be operated in a four wheel drive mode low gear range where the front wheels and rear wheels receive power from driveline torque sources (e.g., internal combustion engines and/or electric machines) and where the gear ratio between the torque sources and the wheels is a relatively low gear ratio (e.g., lower than the higher gear ratio). The driveline wheel mode is four wheel drive low gear range in this case.

A driveline wheel mode change may be requested via a human or automated driver operating a switch or input of a controller. If method 400 judges or determines a driveline wheel mode change is requested, then the answer is yes and method 400 proceeds to 432. Otherwise, the answer is no and method 400 proceeds to exit if method 400 determines that a driveline mode change is not requested.

At 432, method 400 inhibits automatic engine starting by not allowing electric current to flow to the starter motor or a BISG, thereby preventing engine rotation. Further, method 400 may inhibit engine starting via preventing fuel flow to the engine. Method 400 proceeds to 434.

At 434, method 400 changes the driveline wheel mode to the requested driveline wheel mode. Method 400 may cause electric current to flow to a driveline wheel mode actuator (e.g., 253 and/or 257 of FIG. 2) to change the driveline wheel mode. Alternatively, electric current flow may be withdrawn (e.g., fully cease current flow) from a driveline wheel mode actuator to change the driveline wheel mode. Method 400 may judge that the driveline wheel mode change is complete after a predetermined amount of time has transpired since method 400 most recently initiated the driveline wheel mode change or if a sensor indicates that the driveline wheel mode change is complete. Method 400 proceeds to 436.

At 436, method 400 allows or permits automatic engine starting by allowing current to flow to the starter motor or a BISG. Further, method 400 may allow engine starting via allowing fuel flow to the engine. When an automatic engine start is requested, the engine is automatically started at 436. Method 400 proceeds to exit.

At 410, method 400 judges if a driveline wheel mode change is in process. A driveline wheel mode change may be in process if a driveline wheel mode change is requested, but not completed. For example, the driveline wheel mode change request may be made to change from a two wheel drive mode to a four wheel drive mode high gear range mode. Electrical current may be applied to or withdrawn from an electric driveline wheel mode actuator, but the electric driveline wheel mode actuator may not have traveled through a sufficient range to complete the driveline wheel mode change. If method 400 judges or determines a driveline wheel mode change is in process but not completed, then the answer is yes and method 400 proceeds to 412. Otherwise, the answer is no and method 400 proceeds to 420 if method 400 determines that a driveline mode change is not in process.

At 412, method 400 completes the driveline mode change by waiting until the electric driveline wheel mode actuator travels through a predetermined distance or engages the desired driveline wheel mode. Method 400 proceeds to 414.

At 414, method 400 inhibits driveline wheel mode changes by allowing or not allowing electrical current to flow to one or more electric driveline wheel mode actuators. Electrical current may be prevented from flowing to the electric driveline wheel mode actuator if the driveline is presently engaged in a mode where electrical current does not flow to the electrical driveline wheel mode actuator. Conversely, electrical current may continue to be supplied to the electric driveline wheel mode actuator if the driveline is presently engaged in a mode where electrical current flows to the electrical driveline wheel mode actuator. Method 400 proceeds to 416.

At 416, method 400 automatically starts the engine. The engine is started by directing electrical current to the starter or the BISG and supplying fuel and spark to the engine. The starter or BISG rotates the engine while fuel and spark are delivered to the engine during engine starting. The engine is started and running (e.g., combusting fuel) after its speed is greater than a threshold speed. Method 400 proceeds to 418 after the engine is started.

At 418, method 400 allows or permits driveline wheel mode changes. Method 400 may allow or not allow electrical current to flow to one or more electric driveline wheel mode actuators to engage a desired driveline wheel mode. Electrical current may be allowed to flow to the driveline wheel mode actuator if the driveline is presently engaged in a mode where electrical current does not flow to the electrical driveline wheel mode actuator and a driveline wheel mode change is desired or requested. Conversely, electrical current may not continue to be supplied to the driveline wheel mode actuator if the driveline is presently engaged in a driveline wheel mode where electrical current flows to the electrical driveline wheel mode actuator and a driveline wheel mode change is desired or requested. Method 400 changes to the desired driveline wheel mode if the desired driveline wheel mode is different from the presently engaged driveline wheel mode. Method 400 proceeds to exit.

At 420, method 400 inhibits driveline wheel mode changes by allowing or not allowing electrical current to flow to one or more electric driveline wheel mode actuators. Electrical current may be prevented from flowing to the electric driveline wheel mode actuator if the driveline is presently engaged in a mode where electrical current does not flow to the electrical driveline wheel mode actuator. Conversely, electrical current may continue to be supplied to the electric driveline wheel mode actuator if the driveline is presently engaged in a mode where electrical current flows to the electrical driveline wheel mode actuator. Method 400 proceeds to 422.

At 422, method 400 automatically starts the engine. The engine is started by directing electrical current to the starter or the BISG and supplying fuel and spark to the engine. The starter or BISG rotates the engine while fuel and spark are delivered to the engine. Method 400 proceeds to 424 after the engine is started.

At 424, method 400 allows or permits driveline wheel mode changes. Method 400 may allow or not allow electrical current to flow to one or more electric driveline wheel mode actuators to engage a desired driveline wheel mode. Electrical current may be allowed to flow to the electric driveline wheel mode actuator if the driveline is presently engaged in a mode where electrical current does not flow to the electrical driveline wheel mode actuator and a driveline wheel mode change is desired or requested. Conversely, electrical current may not continue to be supplied to the electric driveline wheel mode actuator if the driveline is presently engaged in a driveline wheel mode where electrical current flows to the electrical driveline wheel mode actuator and a driveline wheel mode change is desired or requested. Method 400 changes to the desired driveline wheel mode if the desired driveline wheel mode is different from the presently engaged driveline wheel mode. Method 400 proceeds to exit.

In this way, driveline wheel mode changes may be inhibited if an engine is being automatically started. Conversely, if a driveline wheel mode change is in process, automatic engine starting may be inhibited so that an electric driveline wheel mode actuator may be supplied with a sufficient amount of electric power to complete a driveline wheel mode change. Accordingly, degradation of the driveline wheel mode actuator may be reduced and vehicle drivability may be improved by improving the possibility of engaging a desired driveline wheel mode.

Thus, the method of FIG. 4 provides for a method for operating an engine, comprising: automatically stopping an engine via a controller; and via the controller, inhibiting automatic starting of the engine while changing from a first driveline wheel mode to a second driveline wheel mode. The method of includes where inhibiting automatic starting of the engine occurs after the first driveline wheel mode begins to disengage. The method includes where changing from the first driveline wheel mode to the second driveline wheel mode engages a four wheel drive mode and disengages a two wheel drive mode. The method includes where changing from the first driveline wheel mode to the second driveline wheel mode engages a two wheel drive mode and disengages a four wheel drive mode. The method further comprises permitting automatic engine starting after changing from the first driveline wheel mode to the second driveline wheel mode is complete. The method includes where inhibiting automatic starting of the engine includes not allowing a starter to rotate the engine. The method further comprises permitting changing to a third driveline wheel mode when automatically stopping the engine.

The method of FIG. 4 also provides for a method for operating an engine, comprising: automatically stopping an engine via a controller; and via the controller, inhibiting a change from first driveline wheel mode to a second driveline wheel mode while the engine is being automatically started. The method includes where the engine is automatically started without a driver providing input to a device that has a sole purpose of starting and stopping the engine. The method includes where inhibiting changing the first driveline wheel mode to the second driveline wheel mode includes preventing electrical current flow to a driveline wheel mode actuator. The method further comprises allowing changing from the first driveline wheel mode to the second driveline wheel mode after the engine is automatically started. The method includes where the engine is automatically started in response to release of a brake pedal. The method includes where changing from the first driveline wheel mode to the second driveline wheel mode includes changing from two wheel drive to four wheel drive. The method includes where changing from the first driveline wheel mode to the second driveline wheel mode includes changing from four wheel drive to two wheel drive.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
automatically stopping an engine via a controller; and
via the controller, inhibiting automatic starting of the engine while changing from a first driveline wheel mode to a second driveline wheel mode.

2. The method of claim 1, where inhibiting automatic starting of the engine occurs after the first driveline wheel mode begins to be disengaged.

3. The method of claim 1, where changing from the first driveline wheel mode to the second driveline wheel mode engages a four wheel drive mode and disengages a two wheel drive mode.

4. The method of claim 1, where changing from the first driveline wheel mode to the second driveline wheel mode engages a two wheel drive mode and disengages a four wheel drive mode.

5. The method of claim 1, further comprising permitting automatic engine starting after changing from the first driveline wheel mode to the second driveline wheel mode is complete.

6. The method of claim 1, where inhibiting automatic starting of the engine includes not allowing a starter to rotate the engine.

7. The method of claim 1, further comprising permitting changing to a third driveline wheel mode when automatically stopping the engine.

8. A method for operating an engine, comprising:
automatically stopping the engine via a controller;
via the controller, inhibiting a change from a first driveline wheel mode to a second driveline wheel mode while the engine is being automatically started; and
via the controller, inhibiting automatic starting of the engine while changing from the first driveline wheel mode to the second driveline wheel mode.

9. The method of claim 8, where the engine is automatically started without a driver providing input to a device that has a sole purpose of starting and stopping the engine.

10. The method of claim 8, where inhibiting changing the first driveline wheel mode to the second driveline wheel mode includes preventing electrical current flow to a driveline wheel mode actuator.

11. The method of claim 8, further comprising allowing changing from the first driveline wheel mode to the second driveline wheel mode after the engine is automatically started.

12. The method of claim 8, where the engine is automatically started in response to release of a brake pedal.

13. The method of claim 8, where changing from the first driveline wheel mode to the second driveline wheel mode includes changing from two wheel drive to four wheel drive.

14. The method of claim 8, where changing from the first driveline wheel mode to the second driveline wheel mode includes changing from four wheel drive to two wheel drive.

15. A vehicle system, comprising:
- an engine;
- at least one driveline wheel mode actuator; and
- a controller coupled to the engine, the engine controller including executable instructions stored in non-transitory memory to automatically stop the engine via the controller, and inhibit automatic starting of the engine while changing from a first driveline wheel mode to a second driveline wheel mode via the at least one driveline wheel mode actuator.

16. The vehicle system of claim 15, further comprising additional instructions to inhibit changing from the first driveline wheel mode to the second driveline wheel mode while the engine is being automatically started via a starter.

17. The vehicle system of claim 16, further comprising the at least one driveline wheel mode actuator and additional instructions to prevent electrical current flow to the driveline wheel mode actuator while inhibiting changing from the first driveline wheel mode to the second driveline wheel mode.

18. The vehicle system of claim 15, further comprising a driveline wheel mode selector and additional instructions to determine a state of the driveline wheel mode selector.

19. The vehicle system of claim 15, where inhibiting automatic starting of the engine includes preventing a starter from rotating.

20. The vehicle system of claim 19, where inhibiting automatic starting of the engine includes preventing fuel injection to the engine.

* * * * *